United States Patent [19]

Grove et al.

[11] Patent Number: 4,872,699
[45] Date of Patent: Oct. 10, 1989

[54] APPARATUS AND METHOD FOR ADJUSTING CAMBER AND TOE

[76] Inventors: Clinton E. Grove; Robert D. Grove, both of R.R. 2, Elbow Lake, Minn. 56531

[21] Appl. No.: 188,280

[22] Filed: Apr. 29, 1988

[51] Int. Cl.[4] ............................................. B62D 17/00
[52] U.S. Cl. .................................... 280/661; D8/354; 33/613; 384/626; 425/DIG. 129
[58] Field of Search ........................ 280/661; 384/626; 411/535, 539, 541, 545, 548; 425/DIG. 129; 33/613; D8/354

[56] References Cited

U.S. PATENT DOCUMENTS

| 272,392 | 1/1884 | Bigelow | 280/661 X |
|---|---|---|---|
| 275,551 | 9/1884 | Bigelow | 280/661 X |
| 774,042 | 11/1904 | Cooper | 280/661 X |
| 776,971 | 12/1904 | Walsh | 285/184 |
| 1,332,626 | 3/1920 | Henegar | 411/539 |
| 1,492,561 | 5/1924 | Gabriel | 411/539 |
| 2,037,961 | 4/1936 | Boden | 384/571 X |
| 2,281,555 | 5/1942 | Castiglia | 280/661 |
| 2,431,342 | 11/1947 | Perkins | 493/462 |
| 2,772,596 | 12/1956 | Trussell | 411/535 |
| 2,978,253 | 4/1961 | Weiss et al. | 280/661 |
| 3,142,352 | 7/1964 | Johansson | 180/22 |
| 4,037,680 | 7/1977 | Grove | 280/661 X |
| 4,160,561 | 7/1979 | Farnam et al. | 293/1 |
| 4,195,862 | 4/1980 | Specktor et al. | 280/661 |
| 4,420,272 | 12/1983 | Ingalls et al. | 280/661 X |
| 4,684,150 | 8/1987 | Specktor et al. | 280/661 |

OTHER PUBLICATIONS

"FWD Read Wheel Alignment Shims" by Larry Carley, from *Brake & Front End*, Jan. 1988, p. 33.
Article entitled "More on FWD Rear Alignment Shims" by Larry Carley from *Brake & Front End*, Feb. 1988, p. 27.

Primary Examiner—Mitchell J. Hill
Attorney, Agent, or Firm—Dorsey & Whitney

[57] ABSTRACT

A unique shim and method for installing the shim to adjust camber and/or toe in a land vehicle wheel assembly is disclosed. The shim comprises an annular, tapered shim having a shim hub and a plurality of shim tabs extending radially outwardly from the shim hub. A camber and toe adjustment chart is used to determine the angular orientation of the shim required to achieve a desired camber and toe correction, and a template is provided to determine which shim tabs require detachment from the shim hub to provide bolt clearing gaps in the shim.

20 Claims, 26 Drawing Sheets

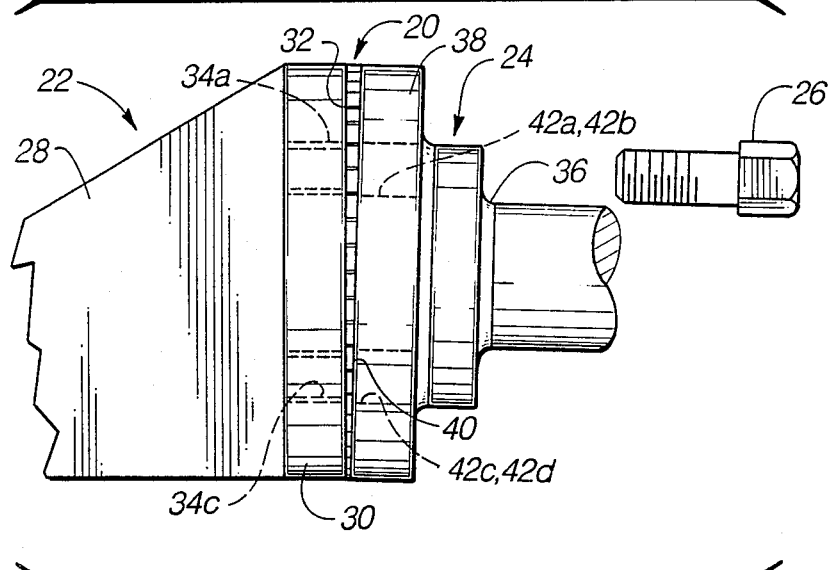
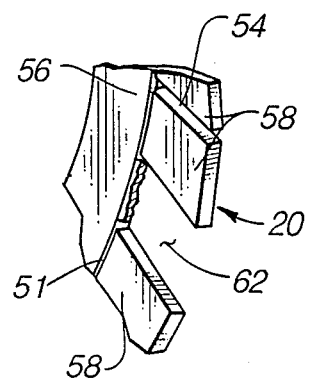
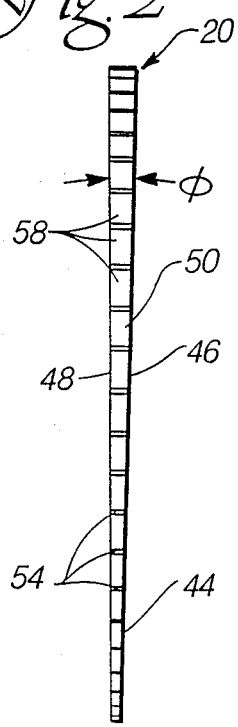
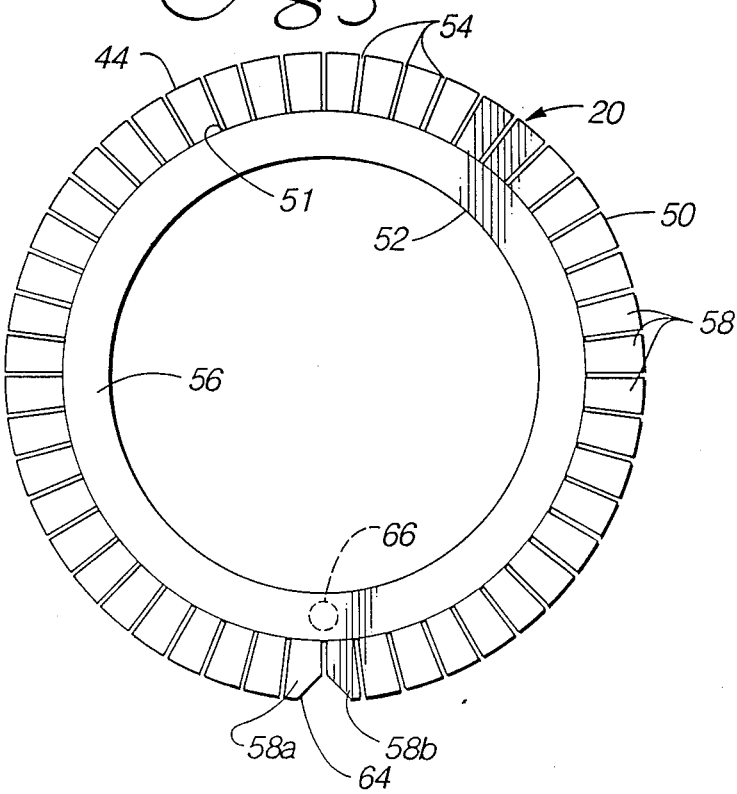

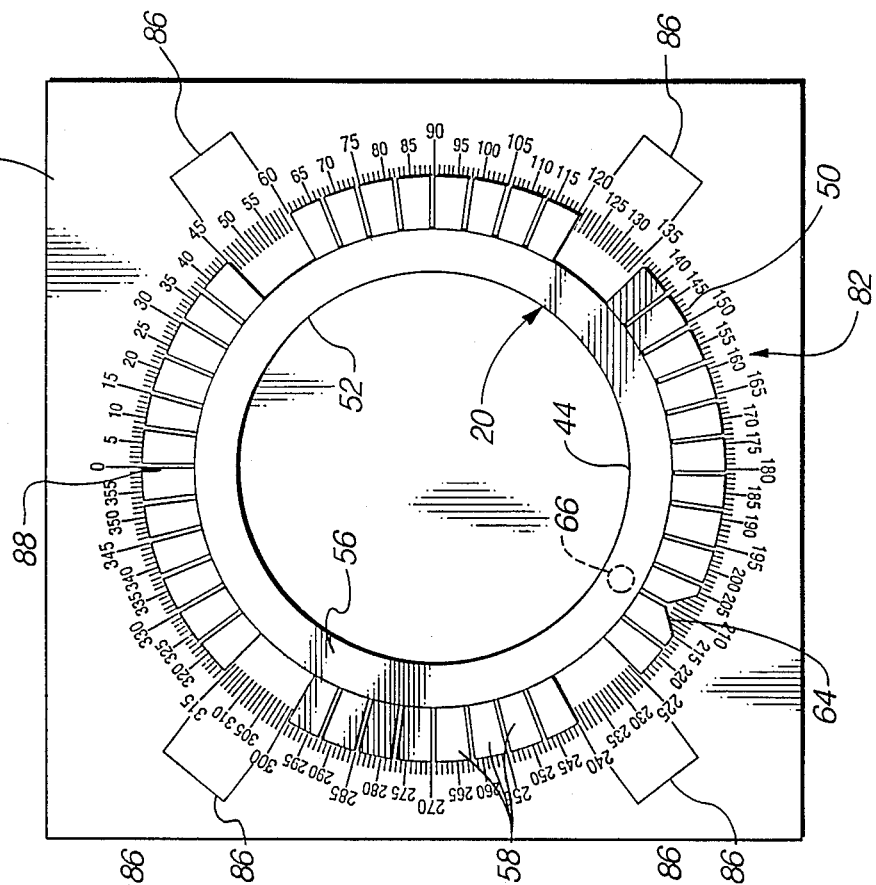
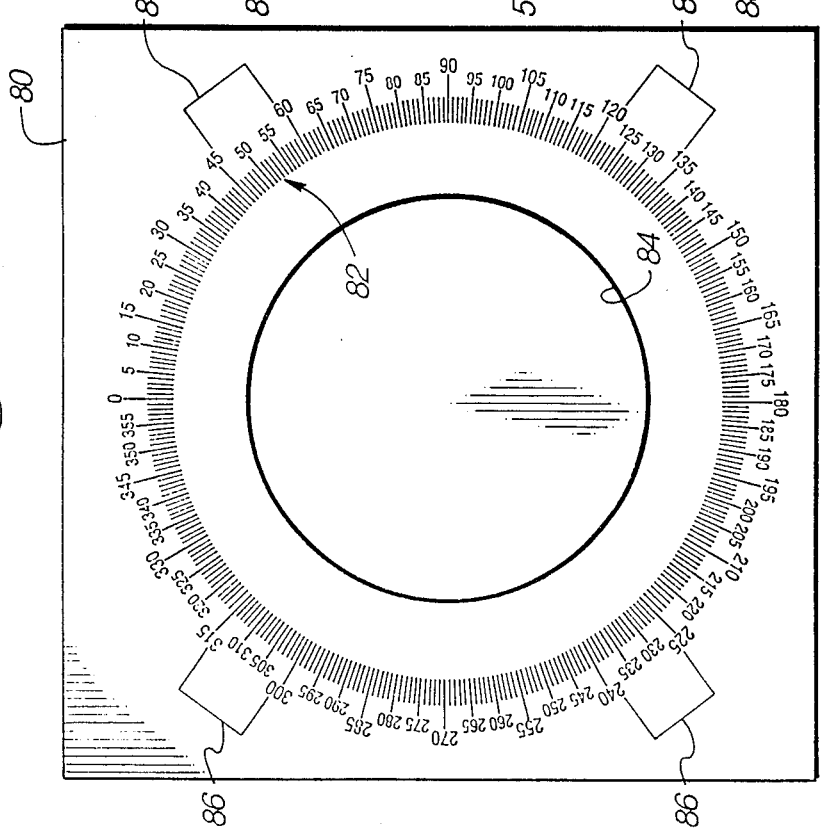

*Fig. 6a*

| | TOE SETTING IS THE MOS | | | |
|---|---|---|---|---|
| | 1) SELECT OUTSIDE TIRE DIAME | | | |
| | 2) MOVE DOWN TO DESIRED TC | | | |
| | 3) MOVE RIGHT TO DESIRED CA | | | |
| | CHANGE OR CLOSEST CAMBE | | | |
| | OUTSIDE TIRE DIAM | | | |
| D E S | 27" | 26" | 25" | 24" |
| | 0<br>.000 | 0<br>.000 | 0<br>.000 | 0<br>.000 |
| | 1/32"<br>.03125 | 1/32"<br>.03125 | 1/32"<br>.03125 | 1/32"<br>.03125 |

*Fig. 6b*

| T CRITICAL! | | | | C | | | | |
|---|---|---|---|---|---|---|---|---|
| ETER | | | | | | | | |
| )E CHANGE | | | | | | | | |
| MBER | | | | | | | | |
| ER SELECTION. | | | | T ⸺76 | | | | |
| ETERS | | | | | | | | |
| 23" | 22" | 1 1/2° | | 1 3/8° | 1 1/4° | | | |
| | | 1.500 | | 1.375 | 1.250 | | | |
| 0 | 0 | 6 | Left | Right | | 5 | Left | Right |
| .000 | .000 | IN | 180 | 180 | | IN | 180 | 180 |
| | | OUT | 180 | 180 | | OUT | 180 | 180 |
| 1/32" | 1/32" | 6 | Left | Right | | 5 | Left | Right |
| .03125 | .03125 | IN | 183 | 177 | | IN | 184 | 176 |
| | | OUT | 177 | 183 | | OUT | 176 | 184 |

*Fig. 6c*

| A | M | B |
|---|---|---|
| O | I N | C R E |

| 1 1/8° | 1° | 7/8° | 3/4° | 5/8° |
|---|---|---|---|---|
| 1.125 | 1.000 | .875 | .750 | .625 |

| | 4 | Left | Right | | 3 | Left | Right | |
|---|---|---|---|---|---|---|---|---|
| | IN | 180 | 180 | | IN | 180 | 180 | |
| | OUT | 180 | 180 | | OUT | 180 | 180 | |
| | 4 | Left | Right | | 3 | Left | Right | |
| | IN | 184 | 176 | | IN | 186 | 174 | |
| | OUT | 176 | 184 | | OUT | 174 | 186 | |

*Fig. 6d*

ER
ASE

| 1/2° | 3/8° | 1/4° | 1/8° | 0° |
|---|---|---|---|---|
| .500 | .375 | .250 | .125 | .000 |

| 2 | Left | Right | | | 1 | Left | Right | | |
|---|---|---|---|---|---|---|---|---|---|
| IN | 180 | 180 | | | IN | 180 | 180 | | |
| OUT | 180 | 180 | | | OUT | 180 | 180 | | |
| 2 | Left | Right | | | 1 | Left | Right | | |
| IN | 189 | 171 | | | IN | 197 | 163 | | |
| OUT | 171 | 189 | | | OUT | 163 | 197 | | |

*Fig. 6e*

| 1/8° | 1/4° | 3/8° | 1/2° | 5/8° |
|---|---|---|---|---|
| .125 | .250 | .375 | .500 | .625 |

| | 1 | Left | Right | | 2 | Left | Right | |
|---|---|---|---|---|---|---|---|---|
| | IN | 0 | 0 | | IN | 0 | 0 | |
| | OUT | 0 | 0 | | OUT | 0 | 0 | |
| | 1 | Left | Right | | 2 | Left | Right | |
| | IN | 343 | 17 | | IN | 351 | 9 | |
| | OUT | 17 | 343 | | OUT | 9 | 351 | |

| 3/4° | 7/8° | 1° | 1 1/8° | 1 1/4° |
|---|---|---|---|---|
| .750 | .875 | 1.000 | 1.125 | 1.250 |

| 3 | Left | Right | | | 4 | Left | Right | | | 5 | Left | Right |
|---|---|---|---|---|---|---|---|---|---|---|---|---|
| IN | 0 | 0 | | | IN | 0 | 0 | | | IN | 0 | 0 |
| OUT | 0 | 0 | | | OUT | 0 | 0 | | | OUT | 0 | 0 |
| 3 | Left | Right | | | 4 | Left | Right | | | 5 | Left | Right |
| IN | 354 | 6 | | | IN | 356 | 4 | | | IN | 356 | 4 |
| OUT | 6 | 354 | | | OUT | 4 | 356 | | | OUT | 4 | 356 |

*Fig. 6h*

| I | | | | |
|---|---|---|---|---|
| R | 1/16″ .0625 | 1/16″ .0625 | 1/16″ .0625 | 1/16″ .0625 |
| | 3/32″ .0937 | 3/32″ .0937 | 3/32″ .0937 | 3/32″ .0937 |
| E | 1/8″ .125 | 1/8″ .125 | 1/8″ .125 | 1/8″ .125 |
| D | 3/16″ .1875 | 5/32″ .156 | 5/32″ .1560 | 5/32″ .156 |
| | 7/32″ .218 | 7/32″ .218 | 3/16″ .1875 | 3/16″ .1875 |
| | 1/4″ .250 | 7/32″ .218 | 7/32″ .218 | 7/32″ .218 |
| T | 9/32″ .281 | 9/32″ .281 | 1/4″ .250 | 1/4″ .250 |
| O | 5/16″ .312 | 5/16″ .312 | 9/32″ .281 | 9/32″ .281 |
| | 11/32″ .343 | 11/32″ .343 | 5/16″ .312 ₇₄ | 5/16″ .312 |
| E | 3/8″ .375 | 3/8″ .375 | 11/32″ .343 | 11/32″ .343 |

Fig. 6i

| | | | | | | | | |
|---|---|---|---|---|---|---|---|---|
| 1/16" .0625 | 1/16" .0625 | 6 IN OUT | Left 186 174 | Right 174 186 | | 5 IN OUT | Left 187 173 | Right 173 187 |
| 3/32" .0937 | 3/32" .0937 | 6 IN OUT | Left 189 171 | Right 171 189 | | 5 IN OUT | Left 190 170 | Right 170 190 |
| 1/8" .125 | 1/8" .125 | 6 IN OUT | Left 192 168 | Right 168 192 | | 5 IN OUT | Left 194 166 | Right 166 194 |
| 5/32" .156 | 5/32" .156 | 6 IN OUT | Left 194 166 | Right 166 194 | | 5 IN OUT | Left 197 163 | Right 163 197 |
| 3/16" .1875 | 3/16" .1875 | 6 IN OUT | Left 197 163 | Right 163 197 | | | | |
| 7/32" .218 | 3/16" .1875 | | | | 6 IN OUT | Left 200 160 | Right 160 200 | |
| 1/4" .250 | 7/32" .218 | | | | 6 IN OUT | Left 203 157 | Right 157 203 | |
| 9/32" .281 | 1/4" .250 | | | | 6 IN OUT | Left 206 154 | Right 154 206 | |
| 5/16" .312 | 9/32" .281 | | | | | 6 IN OUT | Left 210 150 | Right 150 210 |
| 11/32" .343 | 5/16" .312 | | | | | 6 IN OUT | Left 213 147 | Right 147 213 |

Fig. 6j

| | | | | | | | | | |
|---|---|---|---|---|---|---|---|---|---|
| | 4 | Left | Right | | | 3 | Left | Right | |
| | IN | 188 | 172 | | | IN | 191 | 169 | |
| | OUT | 172 | 188 | | | OUT | 169 | 191 | |
| | 4 | Left | Right | | | 3 | Left | Right | |
| | IN | 193 | 167 | | | IN | 197 | 163 | |
| | OUT | 167 | 193 | | | OUT | 163 | 197 | |
| | 4 | Left | Right | | | 3 | Left | Right | |
| | IN | 197 | 163 | | | IN | 203 | 157 | |
| | OUT | 163 | 197 | | | OUT | 157 | 203 | |
| | | | | 4 | Left | Right | | 3 | Left | Right |
| | | | | IN | 202 | 158 | | IN | 210 | 150 |
| | | | | OUT | 158 | 202 | | OUT | 150 | 210 |
| 5 | Left | Right | | 4 | Left | Right | | 3 | Left | Right |
| IN | 201 | 159 | | IN | 207 | 153 | | IN | 217 | 143 |
| OUT | 159 | 201 | | OUT | 153 | 207 | | OUT | 143 | 217 |
| 5 | Left | Right | | 4 | Left | Right | | | | |
| IN | 205 | 155 | | IN | 212 | 148 | | | | |
| OUT | 155 | 205 | | OUT | 148 | 212 | | | | |
| 5 | Left | Right | | | | | | 4 | Left | Right |
| IN | 209 | 151 | | | | | | IN | 217 | 143 |
| OUT | 151 | 209 | | | | | | OUT | 143 | 217 |
| | | | | 5 | Left | Right | | 4 | Left | Right |
| | | | | IN | 212 | 148 | | IN | 222 | 138 |
| | | | | OUT | 148 | 212 | | OUT | 138 | 222 |
| | | | | 5 | Left | Right | | 4 | Left | Right |
| | | | | IN | 217 | 143 | | IN | 228 | 132 |
| | | | | OUT | 143 | 217 | | OUT | 132 | 228 |
| | | | | 5 | Left | Right | | 4 | Left | Right |
| | | | | IN | 221 | 139 | | IN | 235 | 125 |
| | | | | OUT | 139 | 221 | | OUT | 125 | 235 |

Fig. 6k

| | | | | | | |
|---|---|---|---|---|---|---|
| 2 Left/Right — IN 197/163 — OUT 163/197 | | | 1 Left/Right — IN 217/143 — OUT 143/217 | | | |
| 2 Left/Right — IN 206/154 — OUT 154/206 | | | | 1 Left/Right — IN 240/120 — OUT 120/240 | 1 Left/Right — IN 270/90 — OUT 90/270 | |
| | 2 Left/Right — IN 217/143 — OUT 143/217 | | | | | |
| | 2 Left/Right — IN 228/132 — OUT 132/228 | | | | | |
| | | 2 Left/Right — IN 243/117 — OUT 117/243 | | | | |
| 3 Left/Right — IN 224/136 — OUT 136/224 | | | | 2 Left/Right — IN 255/105 — OUT 105/255 | 2 Left/Right — IN 270/90 — OUT 90/270 | |
| 3 Left/Right — IN 233/127 — OUT 127/233 | | | | | | |
| | 3 Left/Right — IN 243/117 — OUT 117/243 | 3 Left/Right — IN 250/110 — OUT 110/250 | | | | |
| | | | | 3 Left/Right — IN 260/100 — OUT 100/260 | 3 Left/Right — IN 270/90 — OUT 90/270 | |

Fig. 61

| | 1 Left Right | | 2 Left Right | |
|---|---|---|---|---|
| | IN 323 \| 37 | | IN 343 \| 17 | |
| | OUT 37 \| 323 | | OUT 17 \| 343 | |
| 1 Left Right | | | 2 Left Right | |
| IN 300 \| 60 | | | IN 334 \| 26 | |
| OUT 60 \| 300 | | | OUT 26 \| 334 | |
| | | 2 Left Right | | |
| | | IN 323 \| 37 | | |
| | | OUT 37 \| 323 | | |
| | | 2 Left Right | | 3 Left Right |
| | | IN 312 \| 48 | | IN 330 \| 30 |
| | | OUT 48 \| 312 | | OUT 30 \| 330 |
| | 2 Left Right | | | 3 Left Right |
| | IN 297 \| 63 | | | IN 323 \| 37 |
| | OUT 63 \| 297 | | | OUT 37 \| 323 |
| 2 Left Right | | | 3 Left Right | |
| IN 285 \| 75 | | | IN 316 \| 44 | |
| OUT 75 \| 285 | | | OUT 44 \| 316 | |
| | | | 3 Left Right | |
| | | | IN 307 \| 53 | |
| | | | OUT 53 \| 307 | |
| | 3 Left Right \| 3 Left Right | | | |
| | IN 290 \| 70 \| IN 297 \| 63 | | | |
| | OUT 70 \| 290 \| OUT 63 \| 297 | | | |
| 3 Left Right | | | | 4 Left Right |
| IN 280 \| 80 | | | | IN 312 \| 48 |
| OUT 80 \| 280 | | | | OUT 48 \| 312 |
| | | | | 4 Left Right |
| | | | | IN 305 \| 55 |
| | | | | OUT 55 \| 305 |

Fig. 6m

| | | | | | | | | | | |
|---|---|---|---|---|---|---|---|---|---|---|
| 3 | Left | Right | | 4 | Left | Right | | 5 | Left | Right |
| IN | 349 | 11 | | IN | 352 | 8 | | IN | 353 | 7 |
| OUT | 11 | 349 | | OUT | 8 | 352 | | OUT | 7 | 353 |
| 3 | Left | Right | | 4 | Left | Right | | 5 | Left | Right |
| IN | 343 | 17 | | IN | 347 | 13 | | IN | 350 | 10 |
| OUT | 17 | 343 | | OUT | 13 | 347 | | OUT | 10 | 350 |
| 3 | Left | Right | | 4 | Left | Right | | 5 | Left | Right |
| IN | 337 | 23 | | IN | 343 | 17 | | IN | 346 | 14 |
| OUT | 23 | 337 | | OUT | 17 | 343 | | OUT | 14 | 346 |
| | | | 4 | Left | Right | | | 5 | Left | Right |
| | | | IN | 338 | 22 | | | IN | 343 | 17 |
| | | | OUT | 22 | 338 | | | OUT | 17 | 343 |
| | | | 4 | Left | Right | | 5 | Left | Right | |
| | | | IN | 333 | 27 | | IN | 339 | 21 | |
| | | | OUT | 27 | 333 | | OUT | 21 | 339 | |
| | | | 4 | Left | Right | | 5 | Left | Right | |
| | | | IN | 328 | 32 | | IN | 335 | 25 | |
| | | | OUT | 32 | 328 | | OUT | 25 | 335 | |
| 4 | Left | Right | | | | | | 5 | Left | Right |
| IN | 323 | 37 | | | | | | IN | 331 | 29 |
| OUT | 37 | 323 | | | | | | OUT | 29 | 331 |
| 4 | Left | Right | | 5 | Left | Right | | | | |
| IN | 318 | 42 | | IN | 328 | 32 | | | | |
| OUT | 42 | 318 | | OUT | 32 | 328 | | | | |
| | | | | 5 | Left | Right | | 6 | Left | Right |
| | | | | IN | 323 | 37 | | IN | 330 | 30 |
| | | | | OUT | 37 | 323 | | OUT | 30 | 330 |
| | | | | 5 | Left | Right | | 6 | Left | Right |
| | | | | IN | 319 | 41 | | IN | 327 | 33 |
| | | | | OUT | 41 | 319 | | OUT | 33 | 327 |

*Fig. 6n*

| | | 6 | Left | Right |
|---|---|---|---|---|
| | | IN | 354 | 6 |
| | | OUT | 6 | 354 |
| | | 6 | Left | Right |
| | | IN | 351 | 9 |
| | | OUT | 9 | 351 |
| | | 6 | Left | Right |
| | | IN | 348 | 12 |
| | | OUT | 12 | 348 |
| | | 6 | Left | Right |
| | | IN | 346 | 14 |
| | | OUT | 14 | 346 |
| | | 6 | Left | Right |
| | | IN | 343 | 17 |
| | | OUT | 17 | 343 |
| 6 | Left | Right | | |
| IN | 340 | 20 | | |
| OUT | 20 | 340 | | |
| 6 | Left | Right | | |
| IN | 337 | 23 | | |
| OUT | 23 | 337 | | |
| 6 | Left | Right | | |
| IN | 334 | 26 | | |
| OUT | 26 | 334 | | |

Fig. 6o

| | | | |
|---|---|---|---|
| 7/16" .437 | 13/32" .406 | 13/32" .406 | 3/8" .375 |
| 15/32" .468 | 7/16" .437 | 7/16" .437 | 13/32" .406 |
| 1/2" .500 | 15/32" .468 | 15/32" .468 | 7/16" .437 |
| 17/32" .531 | 1/2" .500 | 1/2" .500 | 15/32" .468 |
| 9/16" .562 | 17/32" .531 | 17/32" .531 | 1/2" .500 |
| 19/32" .593 | 9/16" .562 | 9/16" .562 | 17/32" .531 |
| 5/8" .625 | 19/32" .593 | 9/16" .562 | 9/16" .562 |
| 21/32" .656 | 5/8" .625 | 19/32" .593 | 19/32" .593 |
| 11/16" .687 | 21/32" .656 | 5/8" .625 | 5/8" .625 |
| 23/32" .718 | 11/16" .687 | 21/32" .656 | 5/8" .625 |

CHANGE

Fig. 6p

| | | | | | | |
|---|---|---|---|---|---|---|
| 3/8" .375 | 11/32" .343 | | | 6 | Left | Right |
| | | | | IN | 217 | 143 |
| | | | | OUT | 143 | 217 |
| 3/8" .375 | 3/8" .375 | | | | | |
| 7/16" .437 | 13/32" .406 | | | | | |
| 15/32" .468 | 7/16" .437 | | | | | |
| 15/32" .468 | 15/32" .468" | | | | | |
| 1/2" .500 | 15/32" .468 | | | | | |
| 17/32" .531 | 1/2" .500 | | | | | |
| 9/16" .562 | 17/32" .531 | | | | | |
| 19/32" .593 | 9/16" .562 | | | | | |
| 19/32" .593 | 9/16" .562 | | | | | |

Fig. 6q

| | | | 5 | Left | Right | | | | | |
|---|---|---|---|---|---|---|---|---|---|---|
| | | | IN | 226 | 134 | | | | | |
| | | | OUT | 134 | 226 | | | | | |
| 6 | Left | Right | | | | 5 | Left | Right | | |
| IN | 220 | 140 | | | | IN | 231 | 129 | | |
| OUT | 140 | 220 | | | | OUT | 129 | 231 | | |
| 6 | Left | Right | | | | | | | 5 | Left | Right |
| IN | 224 | 136 | | | | | | | IN | 237 | 123 |
| OUT | 136 | 224 | | | | | | | OUT | 123 | 237 |
| | | 6 | Left | Right | | | | | 5 | Left | Right |
| | | IN | 228 | 132 | | | | | IN | 243 | 117 |
| | | OUT | 132 | 228 | | | | | OUT | 117 | 243 |
| | | | | 6 | Left | Right | | | | |
| | | | | IN | 233 | 127 | | | | |
| | | | | OUT | 127 | 233 | | | | |
| | | | | | | 6 | Left | Right | | |
| | | | | | | IN | 238 | 122 | | |
| | | | | | | OUT | 122 | 238 | | |
| | | | | | | | | | 6 | Left | Right |
| | | | | | | | | | IN | 244 | 116 |
| | | | | | | | | | OUT | 116 | 244 |

Fig. 6r

| | 4 | Left | Right | 4 | Left | Right | | | 4 | Left | Right | 4 | Left | Right | 4 | Left | Right |
|---|---|---|---|---|---|---|---|---|---|---|---|---|---|---|---|---|---|
| | IN | 244 | 116 | IN | 248 | 112 | | | IN | 255 | 105 | IN | 263 | 97 | IN | 270 | 90 |
| | OUT | 116 | 244 | OUT | 112 | 248 | | | OUT | 105 | 255 | OUT | 97 | 263 | OUT | 90 | 270 |
| | 5 | Left | Right | | | | | | | | | | | | | | |
| | IN | 246 | 114 | | | | | | | | | | | | | | |
| | OUT | 114 | 246 | | | | | | | | | | | | | | |
| | | | | 5 | Left | Right | 5 | Left | Right | | | | | | | | |
| | | | | IN | 253 | 107 | IN | 258 | 102 | | | | | | | | |
| | | | | OUT | 107 | 253 | OUT | 102 | 258 | | | | | | | | |
| | | | | | | | | | | 5 | Left | Right | 5 | Left | Right | | |
| | | | | | | | | | | IN | 264 | 96 | IN | 270 | 90 | | |
| | | | | | | | | | | OUT | 96 | 264 | OUT | 90 | 270 | | |
| | 6 | Left | Right | 6 | Left | Right | | | | | | | | | | | |
| | IN | 251 | 109 | IN | 255 | 105 | | | | | | | | | | | |
| | OUT | 109 | 251 | OUT | 105 | 255 | | | | | | | | | | | |
| | | | | | | | 6 | Left | Right | 6 | Left | Right | | | | | |
| | | | | | | | IN | 260 | 100 | IN | 265 | 95 | | | | | |
| | | | | | | | OUT | 100 | 260 | OUT | 95 | 265 | | | | | |
| | | | | | | | | | | | | | | | 6 | Left | Right |
| | | | | | | | | | | | | | | | IN | 270 | 90 |
| | | | | | | | | | | | | | | | OUT | 90 | 270 |

Fig. 6s

|  |  | 4 Left Right | 4 Left Right |  |
|---|---|---|---|---|
|  |  | IN 292 \| 68 | IN 296 \| 64 |  |
|  |  | OUT 68 \| 292 | OUT 64 \| 296 |  |

- 4 IN 277 / 83, OUT 83 / 277
- 4 IN 285 / 75, OUT 75 / 285
- 4 IN 292 / 68, OUT 68 / 292
- 4 IN 296 / 64, OUT 64 / 296
- 5 IN 303 / 57, OUT 57 / 303
- 5 IN 294 / 66, OUT 66 / 294
- 5 IN 297 / 63, OUT 63 / 297
- 5 IN 282 / 78, OUT 78 / 282
- 5 IN 287 / 73, OUT 73 / 287
- 5 IN 276 / 84, OUT 84 / 276
- 6 IN 296 / 64, OUT 64 / 296
- 6 IN 285 / 75, OUT 75 / 285
- 6 IN 289 / 71, OUT 71 / 289
- 6 IN 275 / 85, OUT 85 / 275
- 6 IN 280 / 80, OUT 80 / 280

Each entry has columns: Left | Right

Fig. 6t

| | 5 Left Right | | | 6 Left Right | |
|---|---|---|---|---|---|
| | IN 314 46 | | | IN 323 37 | |
| | OUT 46 314 | | | OUT 37 323 | |
| 5 Left Right | | | 6 Left Right | | |
| IN 309 51 | | | IN 320 40 | | |
| OUT 51 309 | | | OUT 40 320 | | |
| | | | 6 Left Right | | |
| | | | IN 316 44 | | |
| | | | OUT 44 316 | | |
| | | 6 Left Right | | | |
| | | IN 312 48 | | | |
| | | OUT 48 312 | | | |
| | 6 Left Right | | | | |
| | IN 307 53 | | | | |
| | OUT 53 307 | | | | |
| 6 Left Right | | | | | |
| IN 302 58 | | | | | |
| OUT 58 302 | | | | | |

APPARATUS AND METHOD FOR ADJUSTING CAMBER AND TOE

TECHNICAL FIELD

This invention relates to an apparatus and method for adjusting the camber and toe alignment of land vehicle wheel assemblies. In particular, it relates to a unique shim, and a method for installing the shim into the wheel assembly of a vehicle.

BACKGROUND ART

The wheels of automobiles and other land vehicles must be properly aligned to reduce tire wear, and to provide a true, free-rolling movement over the road. Wheel alignment is typically described in terms of camber, toe, caster, turning radius, and steering-axis inclination. Caster, turning radius, and steering-axis inclination are designed-in features, and are generally not subject to adjustment after a vehicle has been manufactured. Camber and toe, however, are subject to close tolerances that are difficult to achieve during manufacture and that require adjustments over the life of a vehicle.

Camber is a measurement in angular degrees of the inward or outward tilt of a wheel as measured from a vertical plane. Camber is usually considered "positive" when the top of the wheel leans outwardly towards the side of the vehicle, and is considered "negative" when the top of the wheel leans inwardly. In other words, two wheels that are at opposite ends of a common axle have positive camber when the tops of the two wheels are further apart from each other than the bottom of the wheels.

Toe is a measurement that compares the distance between the front edges of two tires supported at opposite ends of a common axle to the distance between the rear edges of the tires. In particular, "toe-in" means the front edges of the two tires are closer together than the rear edges of the tires, and "toe-out" means the front edges are further apart than the rear edges.

Incorrect alignment of either camber or toe can lead to rapid and excessive tire wear, adverse handling of a vehicle, and rapid deterioration of the bearings supporting the misaligned wheel. Camber and toe must be optimally set at the factory after assembly of a vehicle. Moreover, camber and toe should be inspected and adjusted after operation of a vehicle over rough roads, involvement of the vehicle in an accident, and during routine maintenance checks.

U.S. Pat. No. 4,037,680, issued to one of the named inventors of this application, discloses an annular, tapered shim that is placed between the spindle of a wheel and the axle to which the wheel spindle is attached. As disclosed in the '680 patent, different shims, each having different amounts of taper, can be placed between the wheel spindle and its supporting axle to selectively adjust the camber of the wheel. Locating the point of maximum thickness at the top of the installed shim yields a camber adjustment equal to the angle of taper. The shims include a plurality of apertures such that the bolts holding the wheel spindle to the axle can be received through the shim. A somewhat similar shim is shown in U.S. Pat. No. 4,195,862. With such shims multiple bolt apertures are used to permit a single shim to fit several different types of wheel spindles, but do not appear to have been used to rotationally select the different locations for the point of maximum thickness.

U.S. Pat. No. 4,684,150 discloses an annular, tapered shim for adjusting both the camber and toe of a wheel. The shim disclosed in the '150 patent includes a plurality of bolt clearing notches along its peripheral edge so that the shim can be placed between the wheel spindle and the axle in a variety of angular positions while providing clearance through different ones of the notches for the bolts connecting the spindle to the axle. Adjustment of toe, camber, or a combination of toe and camber, can be selected by changing the angular orientation of the shim so that its point of maximum thickness is at different points between the spindle and the axle.

Other shims for adjusting camber and/or toe are known. At least one of these achieves angular adjustability by utilizing elongated slots instead of bolt clearing notches along the peripheral edge, e.g., the shim identified by Part Nos. 5501 to 5508 made by Shimco Products Inc.

While the use of shims interposed between wheel spindle and axle has proven to be an effective and economical way to adjust camber and toe, certain design tradeoffs have heretofore limited the effectiveness of most shims used to adjust a combination of camber and toe alignment. In particular, a shim should present as much contact area (bearing surface) as possible to the axle and wheel spindle mounting plates it engages. Maximum bearing surface promotes integrity of the shim and the surfaces it engages, by spreading compressive forces (from wheel fasteners and road roughness) to help prevent distortion of the shim or adjacent surfaces under pressure. It also reduces the possibility of shim slippage. A shim must also, however, present bolt clearing gaps through which the bolts connecting the axle and wheel spindle can be received. It has heretofore been considered axiomatic that, in order to enable a shim to be oriented in a number of angular positions (thereby enabling the selection of a number of combinations of camber and toe adjustment effected by the shim), a great deal of shim material that would otherwise serve as bearing surface must be removed to present multiple or elongated bolt clearing gaps. A shim that could be used to adjust multiple combinations of camber and toe, yet sacrificed less in the tradeoff between bearing surface and the size of the shim bolt clearing gaps, would be a decided advantage.

SUMMARY OF THE INVENTION

A shim for use in adjusting combinations of camber and toe in a land vehicle wheel assembly is provided that maximizes the number of combinations of camber and toe that can be effected with the shim without sacrificing the bearing surface of the shim. The shim comprises an annular, tapered shim plate having a shim hub and a plurality of shim tabs extending radially outwardly from the shim hub. The shim tabs can be selectively broken away from the shim hub to present bolt clearing gaps at any selected position along the shim's periphery.

Installation of the shim is initiated by measuring the alignment of a wheel assembly and determining how much adjustment in camber and toe is required to bring the wheel into proper alignment. An appropriate sized shim is selected depending on the manufacturer and model of the wheel assembly and the amount of toe and/or camber correction needed. A chart setting forth the available toe and camber corrections for shims of a given taper angle is consulted. The chart specifies the shim size and the angular orientation at which the shim should be positioned. A template coordinated with the chart is used to select which shim tabs should be removed to provide bolt clearing gaps for the bolts connecting the wheel assembly and axle when the specified angular orientation of the shim is used. The selected shim tabs are then broken away from the shim hub, and the shim is installed between the axle and wheel assembly in the appropriate angular orientation.

BRIEF DESCRIPTION OF THE DRAWINGS

FIG. 1 is a fragmentary, front elevation view depicting an axle assembly and spindle assembly of a land vehicle having a shim in accordance with the present invention installed therewith;

FIG. 2 is a side view of the shim showing the taper of the shim;

FIG. 3 is a plan view of the shim of FIG. 2;

FIG. 4 is a fragmentary, perspective view of the shim, with one shim tab broken off to present a bolt clearing gap;

FIG. 5 is a plan view of a template for use in determining which shim tabs are to be broken off in a particular application;

FIG. 8 is a plan view of a shim positioned over the template of FIG. 5;

DETAILED DESCRIPTION OF THE DRAWINGS

Figure 6:
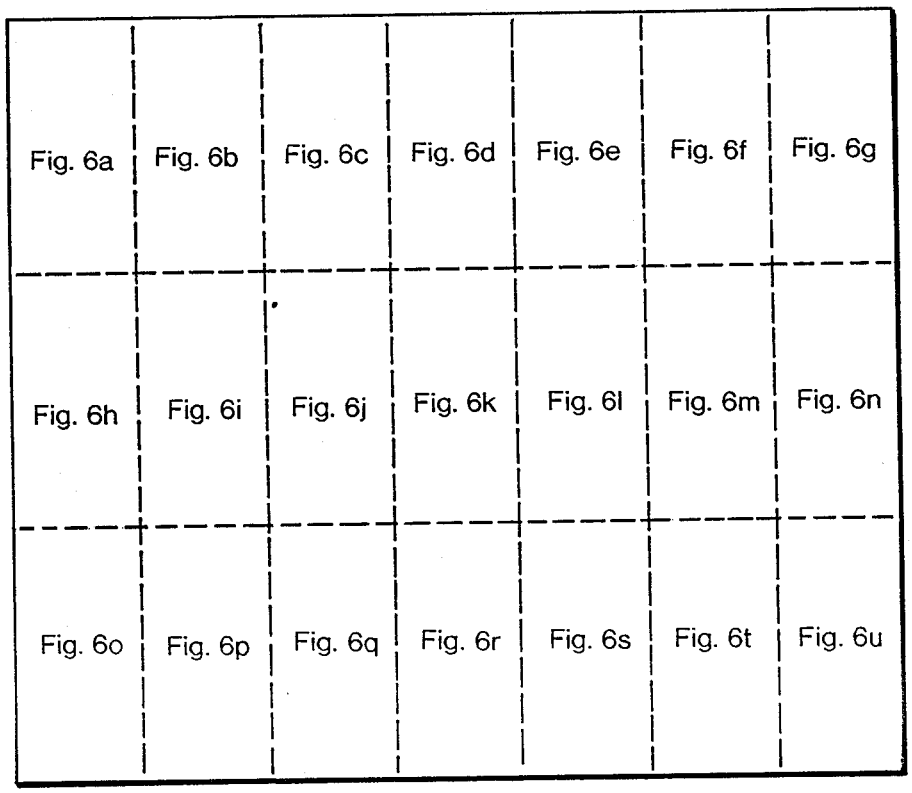
FIG. 6 is a composite drawing consisting of FIGS. 6a-6u, the composite layout of which is shown in FIG. 6, together containing a plan view of an alignment chart relating camber and toe adjustment to the angular orientation of a shim.
Figure 6G:
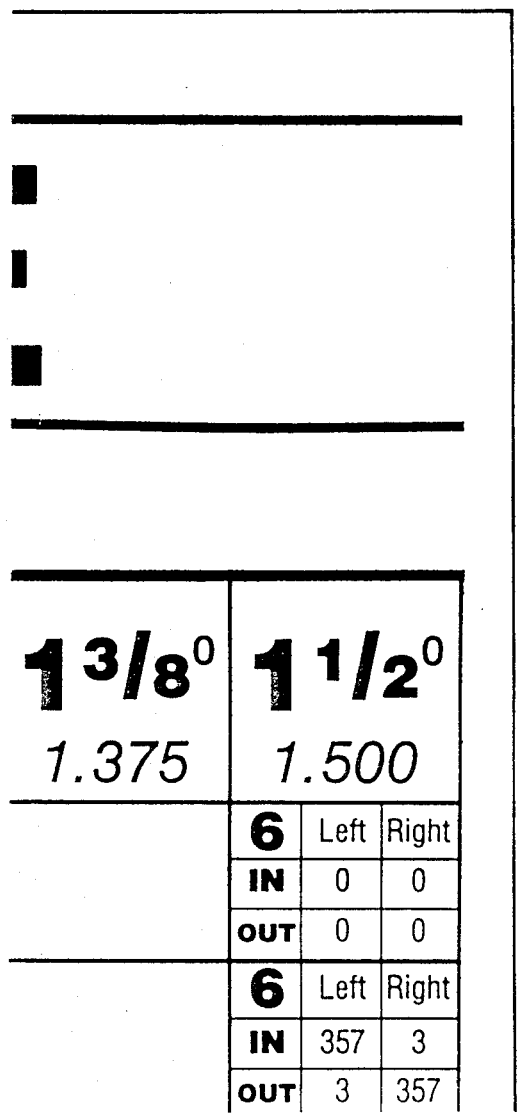
Figure 6U:
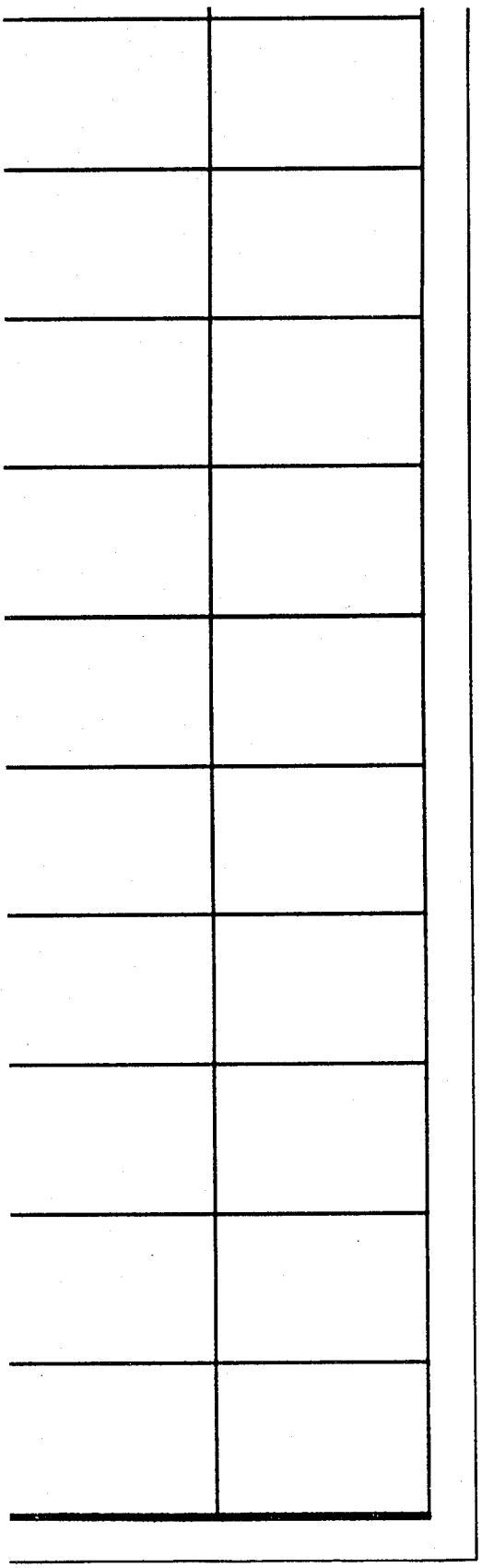

Referring to the drawings, a shim 20, in accordance with the present invention, is depicted in FIG. 1 in conjunction with an axle assembly 22 and a wheel spindle assembly 24 of a land vehicle. The shim 20 is interposed between the axle assembly 22 and wheel spindle assembly 24. A plurality of bolts similar to bolt 26 connects the wheel spindle assembly 24 to the axle assembly 22. The bolts 26 pass through the shim 20 and also serve to maintain the shim 20 in a fixed angular position between the wheel assembly 24 and axle assembly 22.

The axle assembly 22 includes axle frame 28 and axle face plate 30. As can be best seen in FIG. 9, the axle face plate 30 presents a smooth, planar, shim-engaging surface 32. A plurality of threaded, bolt-receiving channels 34a, 34b, 34c, 34d extend through the axle face plate 30.

Wheel spindle assembly 24 includes spindle 36 adapted for receiving and rotatably supporting a wheel (not shown) and a spindle face plate 38. The spindle face plate 38 includes a smooth, planar, shim-engaging surface 40, and a plurality of non-threaded, bolt receiving channels 42a, 42b, 42c, 42d. The channels 42a, 42b, 42c, 42d are oriented in a pattern identical to the pattern presented by the bolt receiving channels 34a, 34b, 34c, 34d in the axle face plate 30.

As best seen in FIGS. 2 and 3, the shim 20 comprises a tapered, annular shim plate 44. The shim plate 44 includes first and second opposed, generally planar surfaces 46, 48, an outer edge 50, and inner edge 52. The outer edge 50 and inner edge 52 are circular and concentric. Between the inner and outer edges 52, 50 lies a median edge 51, also concentric. Referring in particular to FIG. 2, the first and second generally planar shim surfaces 46, 48 lie in non-parallel planes, such that the shim plate 44 presents a tapered profile defining shim angle $\phi$.

A plurality of slots 54 extend radially inwardly from the shim outer edge 50 to the median edge 51. The slots 54 are of equal length and together define a plurality of radially extending shim tabs 58, connected to a centered shim hub 56, defined by the annular area between inner edge 52 and median edge 51. The slots 54 can either be totally open or contain a thin or partial web connecting adjacent tabs 58. Due to the tapered shim profile, the tabs 58 vary in thickness between one peripheral location of the shim where a tab of greatest thickness is located and an opposing peripheral location where a tab of least thickness is located.

Referring to FIG. 4, it will be seen that each shim tab 58 is integrally formed with the shim hub 56. A V-shaped in cross section score line follows the median edge 51 along the intersection of each shim tab 58 with the shim hub 56. Again referring to FIG. 4, one of the shim tabs 58 has been broken away from the shim hub 56 to present a bolt clearing gap 62. Additional, adjacent shim tabs 58 can be broken away to enlarge the gap 62, if necessary. Referring to FIG. 3, a registration notch 64 is present between shim tabs 58a, 58b to indicate the thinnest portion of the shim 20.

Figure 11:
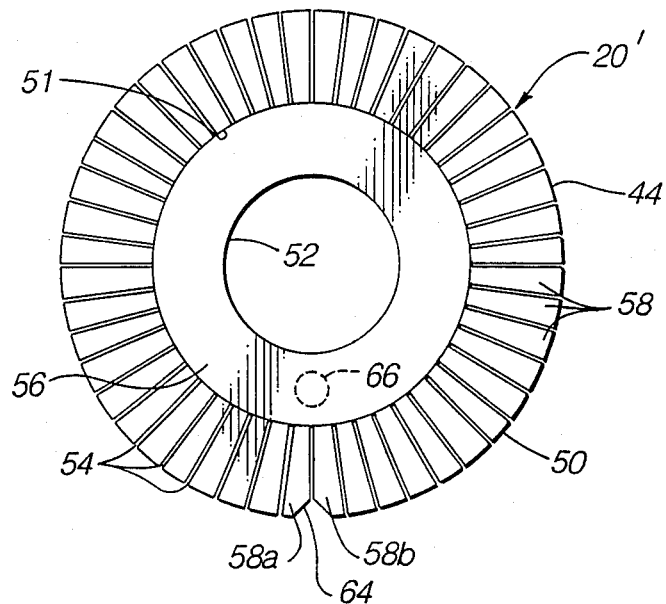
FIG. 11 is a plan view of a second shim in accordance with the present invention.

A second shim 20' is depicted in FIG. 11. The shim 20' is similar to the shim 20, and similar features are annotated in the drawings with identical numbers. Comparing FIG. 3 and FIG. 11, it will be observed that the shim 20' in FIG. 11 differs from shim 20 in FIG. 3 in size and proportion. Such changes in size and proportion are necessary to produce shims that fit various vehicle types, because the size and structure of the axle face plate 30 and spindle face plate 38 vary between vehicle types and models. Such changes in size and proportion are necessary not only to achieve fit but also to achieve the maximum amount of available bearing surface. A marking site 66 is depicted in phantom lines on FIG. 3 and FIG. 11 as a site where coded marks identifying shim angle $\phi$ and the size of the shim can be placed.

In both of the shims 20, 20' of FIGS. 3 and 11, there are forty-eight tabs 58, each occupying about seven and one-half degrees of arc, as measured between the center of adjacent slots 54. Obviously, tabs 58 occupying greater or lesser arcs could be utilized, so long as the amount of material connecting each tab 54 to the shim hub 56 is sufficient to keep the tab 58 stably connected to the shim hub 56 until voluntarily removed. At the same time, the amount of material and the depth of the score line at median line 51 should be such that each tab 54 can be removed with a pair of pliers without great difficulty. Accordingly, depending on the material used for the shim 20 and its thickness, tabs 58 could be expected to occupy roughly two to ten degrees of arc. Narrower tabs would have the advantage that the gaps formed by removing tabs 58 would more nearly have an exact fit with bolts 26, reducing the possibility of rotational slippage.

While the shims 20, 20' could be made of various steels or other metal alloys of high compressive strength, in the preferred embodiment, hard, high compressive strength glass fiber reinforced nylon is used. It can be die-molded in conventional processes. Characteristics of high-compressive strength and minimal resilience are desired, because the essential dimensions of the shims 20, 20' should not change when the shims 20, 20' are installed and the bolts 26 are torqued to manufacturer's specifications.

For most camber and toe correction situations, adjustments to the nearest one-eighth degree (camber) or one-thirty-second inch (toe) suffice. Accordingly, a set of shims made to provide the usual desired degree of adjustment would have shims with a value for the angle $\phi$ in the range between one-eighth degree and one and one-half or two degrees. As will be seen next in the discussion of the operation and method of the invention, this permits a wide range of adjustment for both toe and camber.

FIG. 6 depicts an alignment application chart 70 for use in determining the angular orientation that a shim 20 (or 20') must have to achieve a desired amount of toe and/or camber change. The chart 70 is divided into a plurality of horizontal rows, each row indicative of a desired toe change, and a plurality of vertical columns, with the columns indicative of a desired camber change. The leftmost set of columns in the chart 70 is entitled "Outside Tire Diameters". This is necessary because toe is expressed in inches, a wheel-size-dependent measure rather than angle, as in the case of camber. Data required for entering the chart includes diameter of the wheel to be aligned, and the amount of toe change and camber change required to bring the wheel into proper alignment. These data are obtained by conventional measuring equipment.

Use of the chart 70 is best understood by way of an example. Assume that the alignment of a 24" diameter wheel on the left side of a vehicle has been measured and is determined to be out of proper alignment by a measure of 5/16" toe out and 1¼° negative camber. Assuming zero camber and zero toe are desired, this requires an adjustment of 5/16" toe in and 1¼° positive camber. Referring to FIG. 6, the chart 70 is first entered in column 72, identified as pertaining to a tire having a 24" diameter. Reading down column 72, the block 74 of chart 70, indicating 5/16" desired toe change, is found. The direction of toe change (toe in or toe out) is not considered at this point. Because 1¼° of positive camber is desired, the row indicating 5/16" toe change is followed to the right, from block 74, until it intersects with column 76. Column 76 is identified as 1¼° camber increase. Block 78, at the intersection of the row containing block 74 and column 76, is enlarged in FIG. 7 to depict the chart data needed to achieve 5/16" toe change and 1¼° positive camber change.

Figure 7:
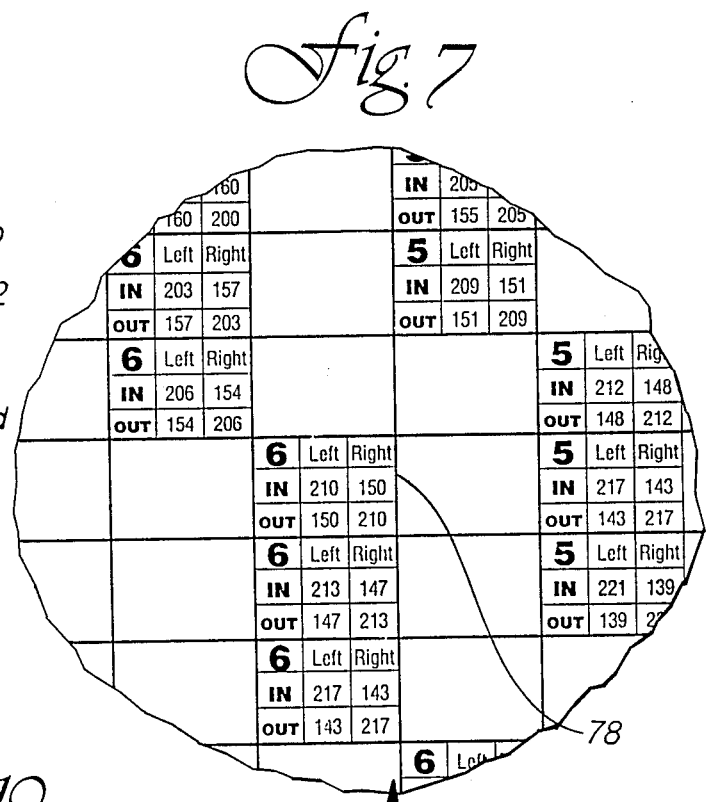
FIG. 7 is an enlarged detail of the view circled at 7 in FIG. 6.

Referring now to FIG. 7, block 78 comprises a matrix showing shim size, applicable left or right tire, and desired toe in or toe out. In particular, a numerical shim size is indicated in the upper, leftmost section of block 78, in this case, a shim size "6", although any set of symbols representing size could be used. A shim size symbol is advantageously indicated on each shim at site 66, and refers indirectly to the amount of taper angle $\phi$ of the shim. Block 78 further includes two horizontal rows labeled "In" and "Out" to indicate toe in and toe out, respectively. In the present example, 5/16" toe in is required to correct the 5/16" toe out misalignment of the wheel. The matrix of block 78 is therefore entered at the row labeled "In". The matrix also includes two columns labeled "L" and "R" for left wheel and right wheel, respectively. In the present example, proper alignment of the left wheel is required, and the "L" column indicates that the angular orientation of the shim 20 (or 20') needed to achieve the desired alignment is 210°. (If the right wheel had been involved, the "R" column would indicate an angular orientation of 150° to achieve the desired adjustment.)

It will be noted that the information set forth in block 78 is an example of the format for other similar blocks in the chart 70. Each block containing similar angular information is based on a straightforward trigonometric (sinusoidal) formula in which the primary variables are the angular position of the point of maximum thickness of the shim 20 and the shim angle $\phi$. For toe data, the wheel size needs to be considered as well. As can be seen, a number of blocks in the chart 70 do not contain information such as set forth in block 78. This indicates that the particular camber and toe adjustment combination indicated by the row and column that intersect at a block lacking information cannot be exactly achieved with the particular shim set for which the chart 70 is made. This usually occurs when a large amount of correction is needed, because the shim angle $\phi$ is small on all shims and this angle limits the total amount of correction available. If use of chart 70 leads to a block lacking information, it is suggested that the user consider the nearest adjacent block having information. The row and column location of each nearby block shows the extent to which the "next best" available shim and angular orientation will deviate from the desired correction. Blocks lacking information such as in block 78 may contain other useful notations, such as the suggestion that the alignment problem may be caused by broken parts or a statement of the exact correction achieved by a combination stated in an adjacent block.

Figure 10:
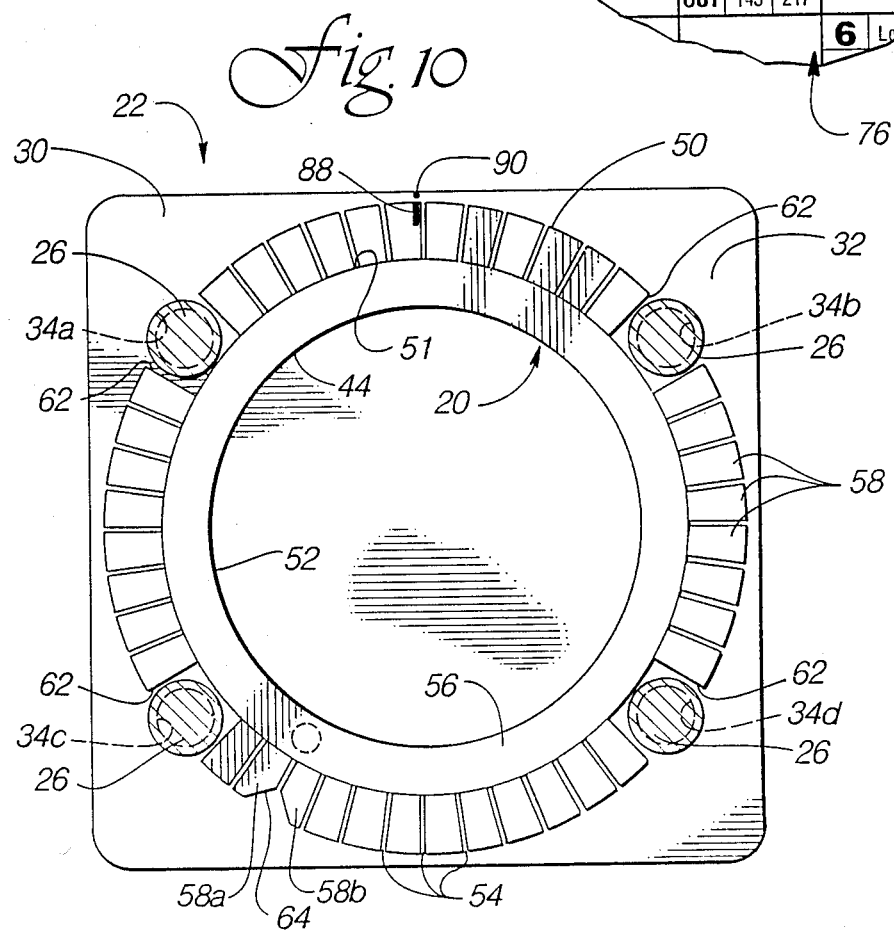
FIG. 10 is an elevation view of the shim-engaging face plate of FIG. 9 with a shim installed thereon.

The angular orientation value determined through use of the chart 70 refers to the number of degrees that the thinnest part of the shim 20, as indicated by alignment notch 64, is rotated from top dead center when installed between an axle and wheel spindle assembly. Referring to FIG. 10, installation of a shim 20 in relation to an axle face plate 30 in accordance with the calculated example is depicted. Note that the alignment of notch 64 is depicted in FIG. 10 in the lower left hand quadrant of the shim 20, rotated 210° clockwise from top dead center.

Again referring to FIG. 10, it will be seen that several pairs of the shim tabs 58 have been removed to present bolt clearing gaps 62 aligned with bolt receiving channels 34a, 34b, 34c, 34d. The template 80 depicted in FIG. 5 and FIG. 8 provides a convenient and accurate method for determining which tabs 58 to remove for a particular application, that is, for a particular axle face plate and bolt configuration. The template 80 comprises a compass rose 82, alignment circle 84, and gap indicating marks 86.

Referring to FIG. 8, and continuing the example used above, a shim 20 is placed on template 80 with the alignment notch 64 aligned with the 210° mark on the template compass rose 82 and the marking site 66 facing upward. The inner edge 50 of the shim 20 is aligned with the template alignment circle 84.

The shim 20 is depicted in FIG. 8 with certain shim tabs 58 removed, so that the shim 20 as a whole no longer has an annular shape. It will be understood that the shim 20 will initially have all shim tabs 58 attached when it is placed on the template 80. The marks 86 indicate where clearances in the shim 20 are required to accomodate bolts 26 when the shim 20 is installed between an axle 22 and wheel spindle assembly 24. Shim tabs 58 that include portions between the marks 86 are removed to present the required gaps. If any web material is present between the tabs 58 to be removed and the adjacent tabs 58, clean removal of tabs 58 is aided by severing such webs with a blade before attempting to break off the tabs 58.

Figure 9:
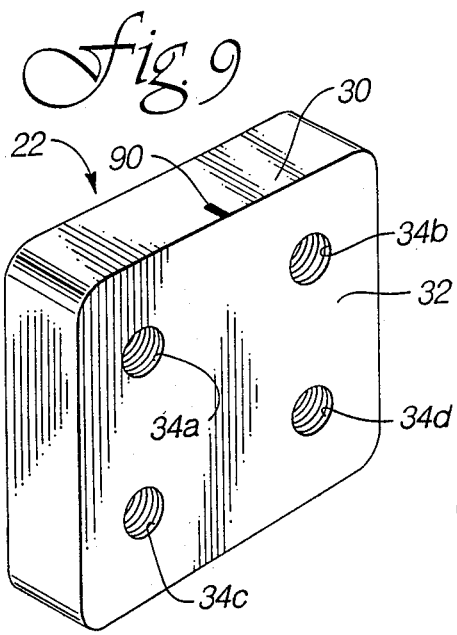
FIG. 9 is a perspective view of the shim-engaging face plate of the axle depicted in FIG. 1.

Again referring to FIG. 8, a mark 88 is made with a grease pencil or the like coincident with the 0° mark on the template 80 to indicate where the top of shim 20 should be when properly installed. A similar mark 90 is made on top center of the axle face plate 30 (FIG. 9). Installation of the shim 20 on the axle face plate 30 in the proper, previously calculated angular orientation is easily accomplished by aligning the marks 88 and 90 (FIG. 10).

Figure 12:
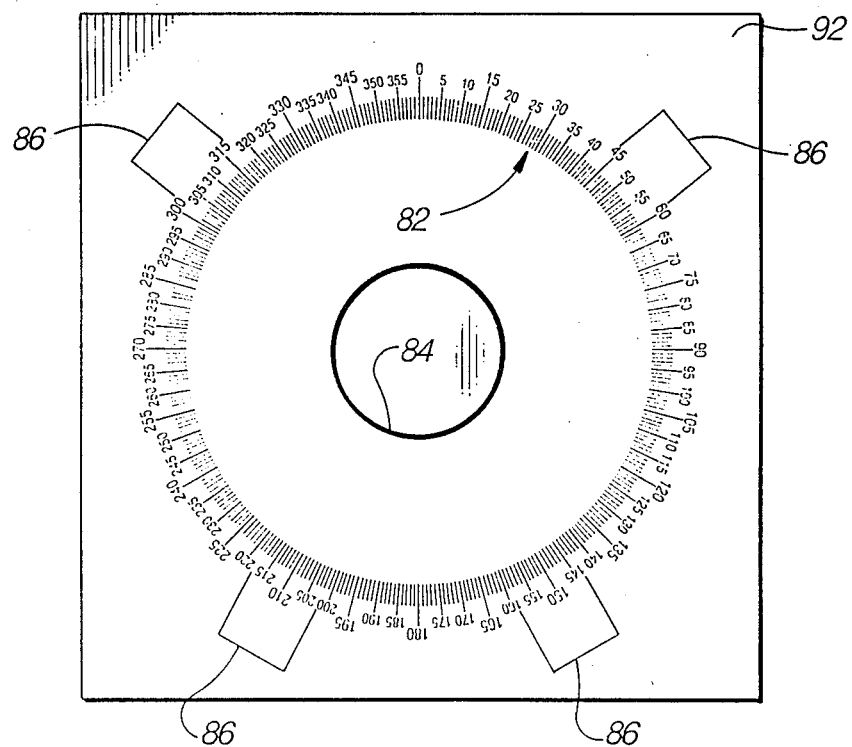
FIG. 12 is a plan view of an alternate template for use with the shim of FIG. 11.

FIG. 12 depicts a template 92 for use in installation of shim 20' in an axle assembly 22 having a different design. Use of template 92 is identical to that described above for template 80, and similar features between templates 80 and 92 are marked with identical numbers. Note that the bolt hole pattern indicated by gap marks 86 on template 92 is different from that of template 80. This is because the axle face plate 30 for which this template 92 is designed has a different bolt hole pattern.

It will be understood that use of chart 70 and template 80 to install shim 20 requires that the same predetermined side of shim 20 be placed face up on template 80 and face out on the axle face plate 30. The site mark 66 can conveniently be used to designate the proper side of the shim 20.

Using the shim 20 with chart 70 and template 80 to adjust camber and toe is a simple and easily taught procedure. Once the bolt clearing gaps 62 are incorporated into the shim 20 and top dead center is marked, the shim 20 is essentially self aligning. The mechanic does not need to select from a plurality of possible bolt clearing gap combinations when placing the shim 20 on the axle face plate 30. Moreover, the shim 20 presents a maximum bearing surface to the axle face plate 30 and spindle face plate 38. The precise positioning of gaps 62 helps prevent rotation of the shim 20 after installation, should the bolts 26 loosen. As an added advantage, in the unusual situations where multiple shims need to be stacked in a single installation, the notches 54 as well as precise positioning of gaps 62 minimizes slippage between adjacent shims.

Although the description of the preferred embodiment has been presented, it is contemplated that various changes could be made without deviating from the spirit of the present invention. In particular, the shim need not be annular in shape, nor need it have a large opening at its center. In some applications greater bearing surface could be obtained by a different peripheral configuration of tabs and by a much smaller center opening. Corresponding changes would be made in templates. Also it should be clear that the removable tabs need not be equal in length or in the amount of angle they occupy. Accordingly, it is intended that the scope of the present invention be dictated by the appended claims rather than by the description of the preferred embodiment.

We claim:

1. A shim for use in adjusting the camber and toe of a wheel comprising:
   a tapered shim hub having a periphery; and
   a plurality of outwardly extending tabs operably, removably coupled to the periphery of said shim hub, said tabs varying radially in thickness around said periphery in accordance with the taper of said shim hub such that said tabs and shim hub together define a shim angle.

2. A shim as recited in claim 1 wherein the shim hub is generally annular and said plurality of tabs extends radially outward from the shim hub.

3. A shim as recited in claim 2 wherein said tabs are of substantially equal length and said plurality of tabs forms a generally annular pattern around and concentric to said shim hub.

4. A shim as recited in claim 3 wherein the tabs vary continuously in thickness from a first peripheral location of the shim where a tab of greatest thickness is located to a second peripheral location 180° opposed to said first location where a tab of least thickness is located.

5. A shim as recited in claim 1 wherein the variation in tab thickness forms a shim having a shim angle between one-eighth degree and two degrees.

6. A shim as recited in claim 1 wherein each tab is removably coupled at a score line.

7. A shim as recited in claim 1 wherein the shim hub is generally annular, said plurality of tabs extends radially outward from the shim hub and each tab occupies between four and ten degrees of arc.

8. A shim as recited in claim 7 wherein each tab occupies seven and one-half of degrees of arc.

9. A shim as recited in claim 1 wherein each tab is separated from the next adjacent tabs by a slot.

10. A shim for use in adjusting the toe and camber alignment of a wheel in a vehicle wheel assembly, the wheel assembly including a spindle for rotatably supporting said wheel, a spindle face plate, an axle, an axle face plate and a plurality of bolts received through said spindle face plate and said axle face plate for detachably, operably coupling said spindle face plate to said axle face plate, said shim comprising:
    a shim plate having a first, generally planar, spindle face plate engaging surface, and a second, opposed, generally planar, axle face plate engaging surface, said first and second surfaces lying in nonparallel planes whereby said shim plate presents a generally tapered profile, said shim plate including structure defining a peripheral edge and a plurality of slots extending inwardly from said peripheral edge to define a centered, tapered shim hub and a plurality of outwardly extending shim tabs removably coupled to said shim hub, said tabs varying radially in thickness around said periphery in accordance with the taper of said shim hub such that said tabs and shim hub together define a shim angle,
    whereby predetermined ones of said shim tabs can be removed from said shim hub to present bolt clearing gaps such that said shim plate can be positioned between said spindle face plate and said axle face plate at a preselected angular orientation to selectively adjust the alignment of said wheel, said bolt clearing gaps receiving said bolts and said hub and said tabs not removed from said hub engaging said spindle face plate and said axle face plate.

11. A shim as recited in claim 10, said shim plate being generally annular and said notches extending radially inwardly such that said shim hub is generally annular and said shim tabs extend radially outwardly from said shim hub.

12. A shim as recited in claim 11 wherein said tabs are of substantially equal length and said plurality of tabs forms a generally annular pattern around and concentric to said shim hub.

13. A shim as recited in claim 12 wherein the tabs vary continuously in thickness from a first peripheral location of the shim where a tab of greatest thickness is located to a second peripheral location 180° opposed to said first location where a tab of least thickness is located.

14. A shim as recited in claim 13 wherein the variation in tab thickness forms a shim having a shim angle between one eighth degree and two degrees.

15. A shim as recited in claim 10 wherein each tab is removably coupled at a score line.

16. A shim as recited in claim 10 wherein each of said tabs occupies between four and ten degrees of arc.

17. A shim as recited in claim 16 wherein each of said tabs occupies seven and one-half of degrees of arc.

18. A method for adjusting the camber, toe, or combinations of camber and toe of a land vehicle wheel assembly having a wheel spindle, an axle, and a plurality of bolts operably coupling said wheel spindle to said axle, comprising the steps of:
   a. measuring the alignment of said wheel to determine the adjustments of toe and camber required to bring said wheel into proper alignment;
   b. providing a tapered shim having a tapered shim hub and a plurality of outwardly extending shim tabs selectively removably coupled to said hub at its periphery, said tabs varying radially in thickness around said periphery in accordance with the taper of the shim hub such that said tabs and said shim hub together define a shim angle;
   c. determining the angular orientation of said shim required to provide the adjustments of toe and camber determined in step a;
   d. detaching required ones of said shim tabs from said shim hub to provide bolt clearing gaps in said shim; and
   e. installing said shim in said wheel assembly at said angular orientation, said bolts being received within said bolt clearing gaps.

19. The method of claim 18, said step of determining the angular orientation of said shim including the steps of providing a chart presenting desired angular orientations of said shim for a plurality of combinations of adjustments of toe and chamber, and using said chart to determine said angular orientation.

20. The method of claim 18, said step of detaching required ones of said shim tabs including the steps of providing a template having positions for said bolt clearing gaps marked thereon, aligning said shim on said template in accordance with said angular orientation, and marking the shim tabs at said positions as the required ones of said shim tabs.

* * * * *